(12) United States Patent
Huang et al.

(10) Patent No.: US 12,234,597 B2
(45) Date of Patent: Feb. 25, 2025

(54) WATER INTAKE DEVICE FOR WASHING APPARATUS, AND WASHING APPARATUS

(71) Applicants: QINGDAO HAIER DRUM WASHING MACHINE CO., LTD., Shandong (CN); Haier Smart Home Co., Ltd., Shandong (CN)

(72) Inventors: Tao Huang, Qingdao (CN); Baozhen Cheng, Qingdao (CN)

(73) Assignees: QINGDAO HAIER DRUM WASHING MACHINE CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 370 days.

(21) Appl. No.: 17/916,213

(22) PCT Filed: Mar. 22, 2021

(86) PCT No.: PCT/CN2021/082106
§ 371 (c)(1),
(2) Date: Sep. 30, 2022

(87) PCT Pub. No.: WO2021/197110
PCT Pub. Date: Oct. 7, 2021

(65) Prior Publication Data
US 2023/0160132 A1   May 25, 2023

(30) Foreign Application Priority Data

Apr. 1, 2020   (CN) .......................... 202010251388.8

(51) Int. Cl.
*D06F 39/08*   (2006.01)
*D06F 39/02*   (2006.01)
*G05D 7/00*   (2006.01)

(52) U.S. Cl.
CPC .......... *D06F 39/088* (2013.01); *D06F 39/028* (2013.01); *G05D 7/005* (2013.01)

(58) Field of Classification Search
None
See application file for complete search history.

(56) References Cited

FOREIGN PATENT DOCUMENTS

| CN | 107022866 A | 8/2017 |
|---|---|---|
| CN | 109957940 A | 7/2019 |

(Continued)

OTHER PUBLICATIONS

CN 109957941 A machine translation, Inlet Valve For Variable Outlet Flow Rate, Washing Device And Control Method Thereof, Huang (Year: 2019).*

(Continued)

*Primary Examiner* — Cristi J Tate-Sims
(74) *Attorney, Agent, or Firm* — Maier & Maier, PLLC

(57) ABSTRACT

A water intake device for a washing apparatus, and a washing apparatus. The water intake device includes a first water intake assembly, a second water intake assembly, a communication assembly, a first flow limiting member and a second flow limiting member, the first flow limiting member and the second flow limiting member are arranged on the first water intake assembly in the direction of a water flow, and the flow rate of the first flow limiting member is less than the flow rate of the second flow limiting member. The communication assembly includes a communicating pipeline coupling the first water intake assembly and the second water intake assembly, and a connection control valve controlling the communicating pipeline to be connected or disconnected. The joint between the first water intake assembly and the communication pipeline is located between the first flow limiting member and the second flow limiting member.

10 Claims, 11 Drawing Sheets

(56) References Cited

FOREIGN PATENT DOCUMENTS

| CN | 109957941 A | 7/2019 | | |
|----|-------------|--------|---|---|
| CN | 209629612 A | 11/2019 | | |
| CN | 212611515 U | 2/2021 | | |
| IT | TO20120794 A1 * | 3/2014 | ............ | D06F 39/08 |
| JP | 2007190245 A | 8/2007 | | |

OTHER PUBLICATIONS

ITTO20120794A1 machine translation, Solenoid Valve Unit, Particularly for Power Supply of a Flow of Water to a Washing Machine (Year: 2014).*

International Search Report issued on Jun. 21, 2021 in corresponding International Application No. PCT/CN2021/082106; 6 pages.

* cited by examiner

WATER INTAKE DEVICE FOR WASHING APPARATUS, AND WASHING APPARATUS

FIELD

The present disclosure belongs to the technical field of washing apparatus, and specifically provides a water inflow device for a washing apparatus, and a washing apparatus.

BACKGROUND

Washing apparatuses include washing machines, shoe washers and dish washers, etc., which generally wash with water, that is, water inflow is required in all of them during washing.

With the continuous progress and development of science and technology, the functions of washing apparatuses are developing towards being more and more diverse, and some of these functions also need to be realized through water inflow. For example, for a washing machine with a clothing drying function, water needs to be supplied into a condenser during drying so as to condense drying air. Since different functions have different requirements on the flow rate of water inflow, in order to realize the functions related to water inflow, water inflow pipelines are generally added in the prior art. However, one pipeline is added with the addition of each function, which causes an overall structure to be bulky and leads to increase of the cost.

Taking the washing machine as an example, in order to meet the continuous increase of user's requirements on use, a drying function is generally added in the existing washing machines. However, since the water supply of two different flow rates is required when supplying water to the condenser, a small-flow continuous water supply and a large-flow water supply are adopted, in which the small-flow continuous water supply provides condensed water, and the large-flow water supply provides functions such as flushing and drying condenser lint. To this end, two independent water inflow pipelines are further added in the washing machine, and an independent solenoid valve is provided in each of these two water inflow pipelines to achieve water supply of different flow rates, which makes the water inflow structure to be bulkier and the manufacture cost to be higher.

Accordingly, there is need in the art for a water inflow device for a washing apparatus and a washing apparatus to solve the above problem.

SUMMARY

In order to solve the above problem in the prior art, that is, to solve the problem that the water inflow structures of existing washing apparatuses are bulky and have a high cost, the present disclosure provides a water inflow device for a washing apparatus, in which the water inflow device includes a body, as well as a first water inflow assembly, a second water inflow assembly, a communication assembly, a first flow restriction member and a second flow restriction member that are arranged on the body; the first flow restriction member and the second flow restriction member are arranged in sequence on the first water inflow assembly in a water flow direction, and a flow rate of the first flow restriction member is smaller than a flow rate of the second flow restriction member; the communication assembly includes a communication pipeline for communicating the first water inflow assembly with the second water inflow assembly, and an on-off control valve for controlling on and off of the communication pipeline; and a connection position between the first water inflow assembly and the communication pipeline is located between the first flow restriction member and the second flow restriction member.

In a preferred technical solution of the above water inflow device, the first water inflow assembly includes a first control valve and a first water inflow pipeline that are connected, the first flow restriction member is arranged inside an outlet of the first control valve, and the second flow restriction member is arranged inside the first water inflow pipeline.

In a preferred technical solution of the above water inflow device, the second water inflow assembly includes a second control valve and a second water inflow pipeline, and the second control valve includes a first outlet and a second outlet, in which the first outlet communicates with the communication pipeline, and the second outlet communicates with the second water inflow pipeline.

In a preferred technical solution of the above water inflow device, the numbers of the second control valve and the second water inflow pipeline are both two, and the second control valves and the second water inflow pipelines correspond to each other in a one-to-one correspondence.

In a preferred technical solution of the above water inflow device, the on-off control valve is a one-way check valve, and the number of the one-way check valve is two; the one-way check valves are respectively arranged inside the first outlets of the two second control valves to prevent water from entering the second control valves from the first outlets.

In a preferred technical solution of the above water inflow device, the water inflow device further includes third flow restriction members, the number of which is two, and the third flow restriction members are respectively arranged inside the two second water inflow pipelines.

In a preferred technical solution of the above water inflow device, the first control valve is a solenoid valve.

In a preferred technical solution of the above water inflow device, the second control valve is a solenoid valve.

In another aspect, the present disclosure also provides a washing apparatus, and the washing apparatus includes the water inflow device described above.

In a preferred technical solution of the above washing apparatus, the washing apparatus is a washing machine which includes a condenser and a detergent dispenser, the first water inflow assembly communicates with the condenser, and the second water inflow assembly communicates with the detergent dispenser.

It can be understood by those skilled in the art that in the preferred technical solutions of the present disclosure, the first flow restriction member and the second flow restriction member are arranged in sequence on the first water inflow assembly in the water flow direction, the flow rate of the first flow restriction member is smaller than the flow rate of the second flow restriction member, the communication assembly communicates the first water inflow assembly with the second water inflow assembly, and the connection position between the first water inflow assembly and the communication assembly is located between the first flow restriction member and the second flow restriction member. Through such an arrangement, the first water inflow assembly can provide water supply of two flow rates; as compared with the prior art, the volume of the water inflow device is smaller and the manufacture cost is lower; in addition, by providing the first flow restriction member and the second flow restriction member, a more accurate flow control can be realized, and in practical applications, different models of flow restriction members can be substituted according to different functions, which is convenient and flexible, and has a wider application range.

In addition, the washing apparatus further provided by the present disclosure on the basis of the above technical solutions, due to the adoption of the water inflow device described above, has the technical effects that the above water inflow device has, and as compared with the washing apparatus before the improvement, the washing apparatus of the present disclosure has a lower manufacture cost.

BRIEF DESCRIPTION OF DRAWINGS

Preferred embodiments of the present disclosure will be described below with reference to the accompanying drawing and in connection with a washing machine. In the drawings.

DETAILED DESCRIPTION

Figure 1:
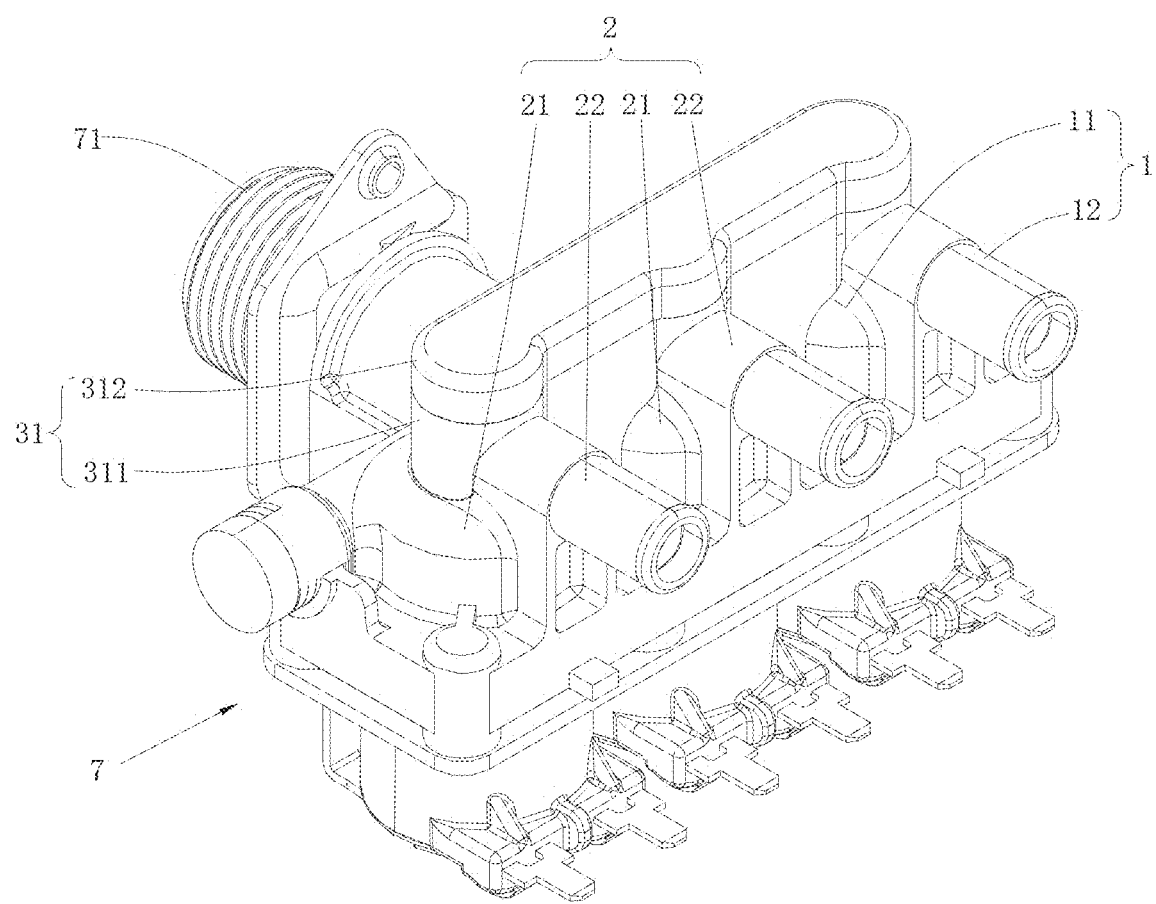
FIG. 1 is a first schematic structural view of a water inflow device of the present disclosure.

Preferred embodiments of the present disclosure will be described below with reference to the accompanying drawings. It should be understood by those skilled in the art that these embodiments are only used to explain the technical principle of the present disclosure, and are not intended to limit the scope of protection of the present disclosure. For example, although the following embodiments are explained and described in connection with a washing machine, this is not limiting. In addition, the technical solutions of the present disclosure are equally applicable to other washing apparatuses, such as shoe washers, dish washers, or washing-drying integrated machines, etc., and such changes to the application object do not deviate from the principle and scope of the present disclosure.

It should be noted that in the description of the present disclosure, terms indicating directional or positional relationships, such as "upper", "lower", "left", "right", "front", "rear", "top", "bottom", "inner", "outer" and the like, are based on the directional or positional relationships shown in the accompanying drawings. They are only used for ease of description, and do not indicate or imply that the device or element must have a specific orientation, or be constructed or operated in a specific orientation, and therefore they should not be considered as limitations to the present disclosure. In addition, terms "first", "second" and "third" are only used for descriptive purposes, and should not be interpreted as indicating or implying relative importance.

In addition, it should also be noted that in the description of the present disclosure, unless otherwise clearly specified and defined, terms "install", "connect" and "connection" should be understood in a broad sense; for example, the connection may be a fixed connection, or may also be a detachable connection, or an integral connection; it may be a mechanical connection, or an electrical connection; it may be a direct connection, or an indirect connection implemented through an intermediate medium, or it may be internal communication between two elements. For those skilled in the art, the specific meaning of the above terms in the present disclosure can be interpreted according to specific situations.

In view of the problem pointed out in the "BACKGROUND OF THE INVENTION" that the water inflow structures of the existing washing machines are bulky and have a high cost, the present disclosure provides a water inflow device for a washing machine, and a washing machine, aiming at reducing the volume of the water inflow device and lowering the manufacture cost of the water inflow device.

Specifically, the washing machine of the present disclosure includes a cabinet, as well as a condenser, a detergent dispenser and a water inflow device that are arranged inside the cabinet. The water inflow device includes a body, as well as a first water inflow assembly, a second water inflow assembly, a communication assembly, a first flow restriction member and a second flow restriction member that are arranged on the body; the first flow restriction member and the second flow restriction member are arranged in sequence on the first water inflow assembly in a water flow direction, and a flow rate of the first flow restriction member is smaller than a flow rate of the second flow restriction member; the first water inflow assembly communicates with the condenser, and the second water inflow assembly communicates with the detergent dispenser; the communication assembly includes a communication pipeline for communicating the first water inflow assembly with the second water inflow assembly, and an on-off control valve for controlling on and off of the communication pipeline; and a connection position between the first water inflow assembly and the communication pipeline is located between the first flow restriction member and the second flow restriction member.

When the first water inflow assembly is connected with an external water supply source, the second water inflow assembly is disconnected from the external water supply source and the on-off control valve is closed, water enters the first water inflow assembly; under the flow restriction action of the first flow restriction member, the first water inflow assembly supplies water to the condenser at a small flow rate. It should be noted that since the flow rate of the first flow restriction member is smaller than the flow rate of the second flow restriction member, the second flow restriction member does not have a flow restriction effect at this time.

When the first water inflow assembly is disconnected from the external water supply source, the second water inflow assembly is connected with the external water supply source and the on-off control valve is opened, water enters the second water inflow assembly, and then is divided into two streams of water, one of which enters the first water inflow assembly through the communication pipeline. Since the connection position between the first water inflow assembly and the communication pipeline is located between the first flow restriction member and the second flow restriction member, the water no longer flows through the first flow restriction member, and directly flows to the second flow restriction member. Under the flow restriction action of the second flow restriction member, the first water inflow assembly supplies water to the condenser at a large flow rate.

Through such an arrangement, the first water inflow assembly can realize water supply of two flow rates; as compared with the prior art, the volume of the water inflow device is smaller and the manufacture cost is lower.

In addition, by providing the first flow restriction member and the second flow restriction member on the first water inflow assembly, a more accurate flow control can be realized, and in practical applications, different models of flow restriction members can be substituted according to different functions, which is convenient and flexible, and has a wider application range.

The technical solutions of the present disclosure will be described in detail below in connection with three specific embodiments.

First Embodiment

Figure 2:
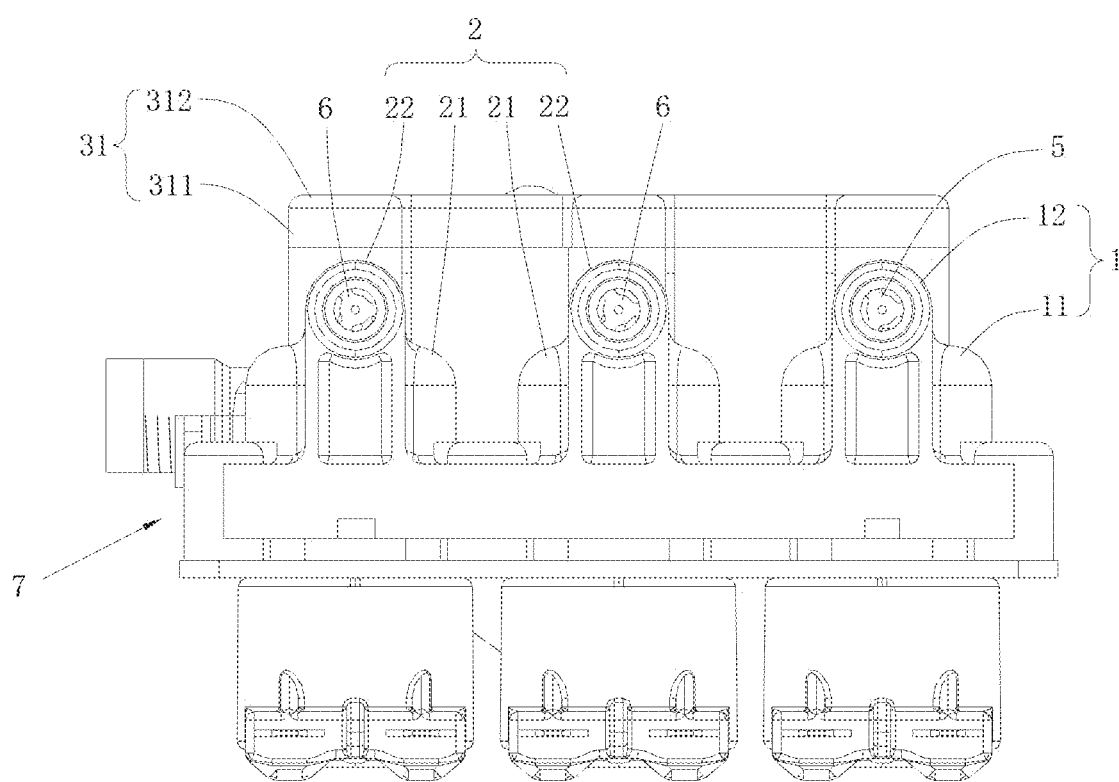
FIG. 2 is a second schematic structural view of the water inflow device of the present disclosure.
Figure 6:
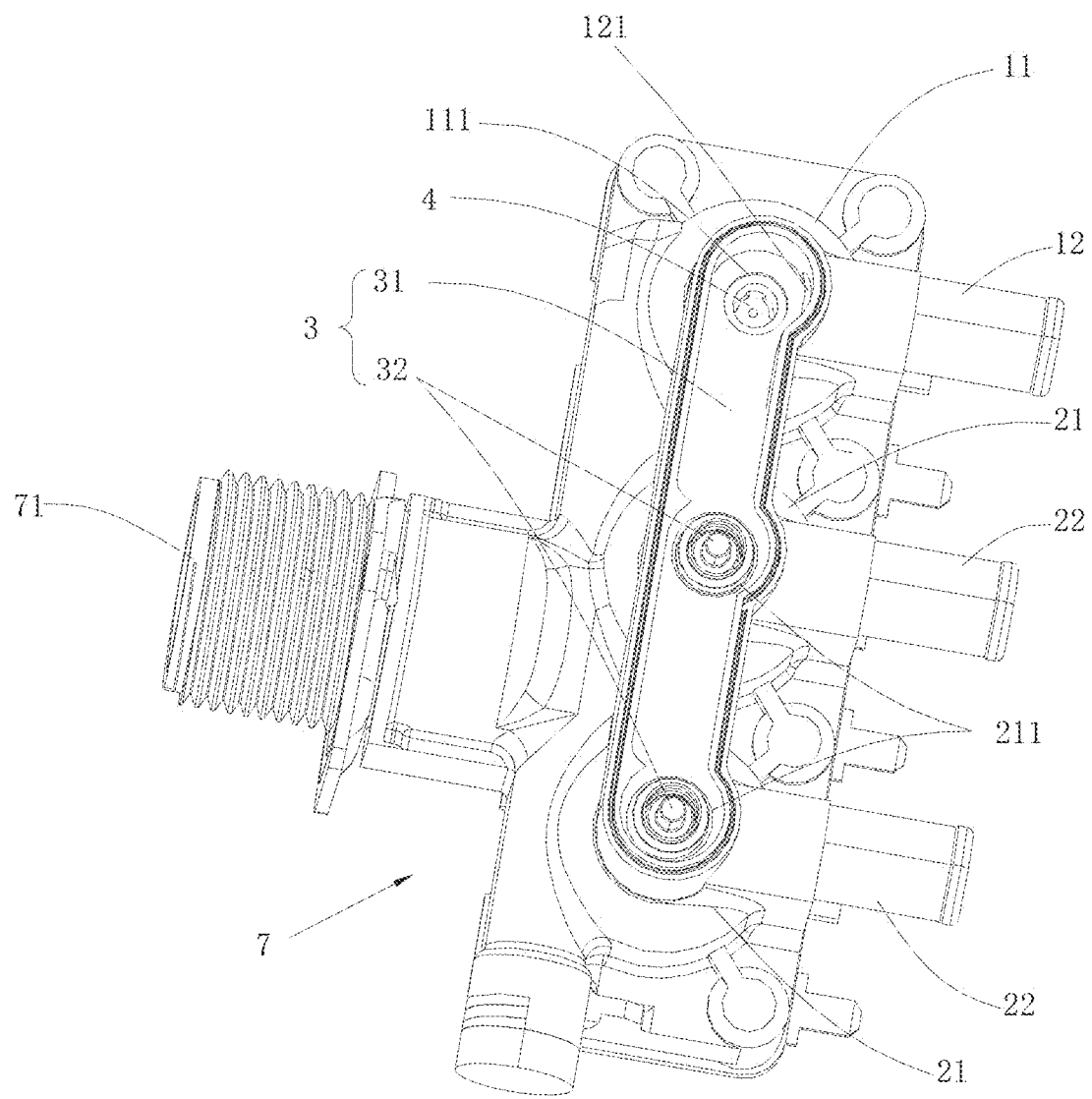
FIG. 6 is a fourth schematic structural view of the water inflow device of the present disclosure.
Figure 7:
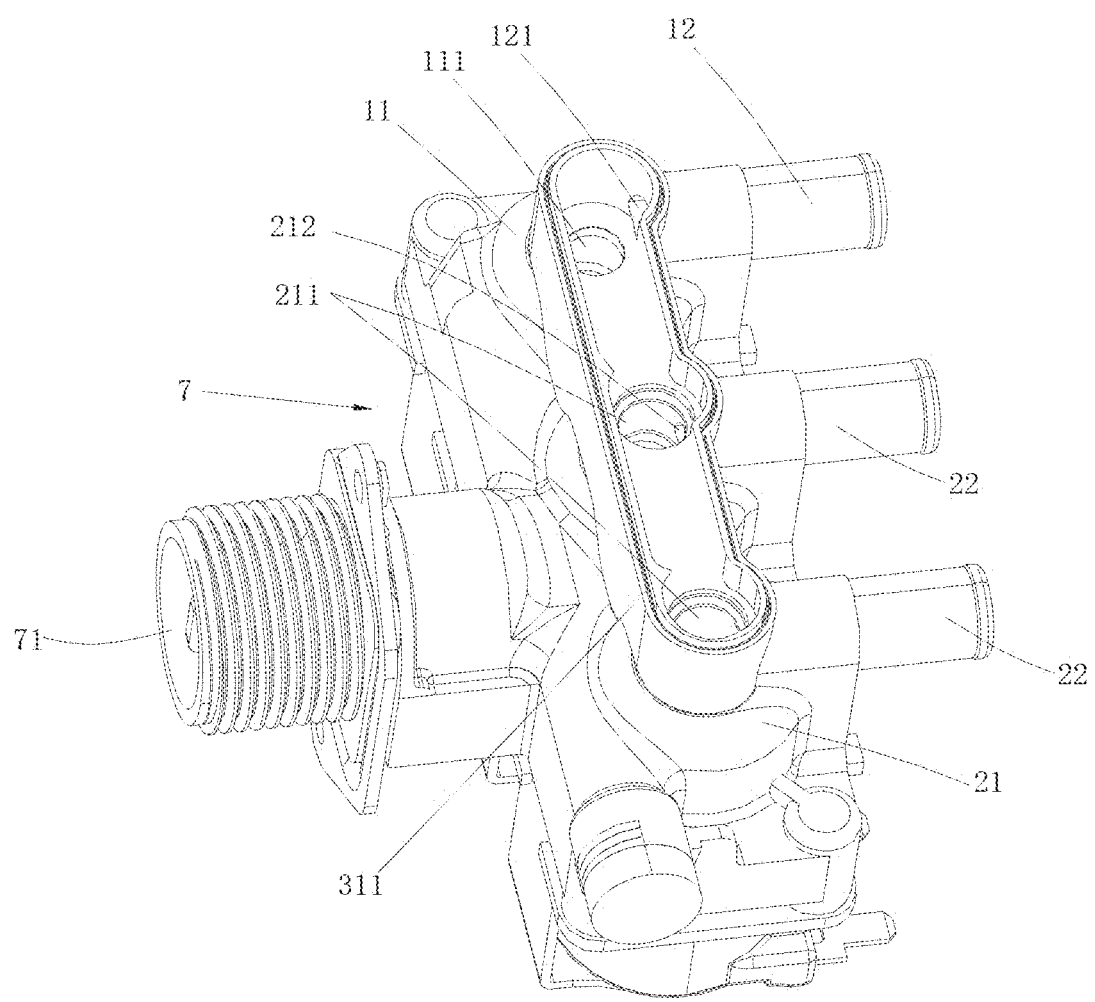
FIG. 7 is a fifth schematic structural view of the water inflow device of the present disclosure.
Figure 8:
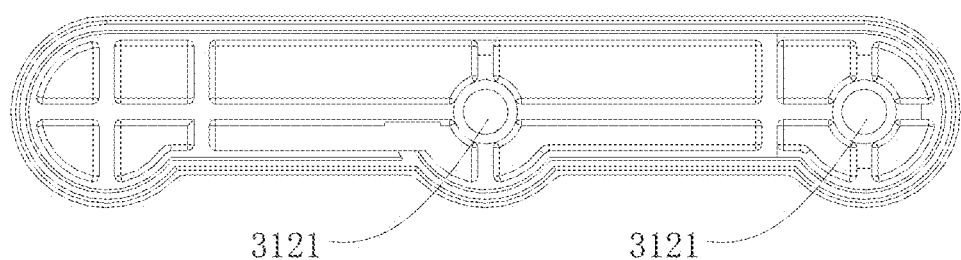
FIG. 8 is a schematic structural view of a cover plate of the water inflow device of the present disclosure.

As shown in FIGS. 1, 2 and 6, the water inflow device of the present disclosure includes a body 7, as well as a first water inflow assembly 1, a second water inflow assembly 2, a communication assembly 3, a first flow restriction member 4, a second flow restriction member 5 and a third flow restriction member 6 that are arranged on the body 7. A centralized water supply port 71 is formed on the body 7. The centralized water supply port 71 is connected with an external water supply source, and both the first water inflow assembly 1 and the second water inflow assembly 2 communicate with the centralized water supply port 71.

It should be noted that two independent water supply ports can also be used for the first water inflow assembly 1 and the second water inflow assembly 2, or the first water inflow assembly 1 and the second water inflow assembly 2 can be directly connected with the external water supply source. Such flexible adjustments and changes do not deviate from the principle and scope of the present disclosure, and should be defined within the scope of protection of the present disclosure.

As shown in FIGS. 1, 2 and 6, the first water inflow assembly 1 includes a first control valve 11 and a first water inflow pipeline 12. The first control valve 11 is preferably a solenoid valve, denoted as a first solenoid valve 11. An inlet (not shown) of the first solenoid valve 11 communicates with the centralized water supply port 71, and an outlet 111 of the first solenoid valve 11 communicates with a water inlet 121 of the first water inflow pipeline 12. The first solenoid valve 11 can control on and off of the connection between the first water inflow pipeline 12 and the centralized water supply port 71. The first flow restriction member 4 is arranged inside the outlet 111 of the first solenoid valve 11 (see FIG. 6 for details), and the second flow restriction member 5 is arranged inside the first water inflow pipeline 12 (see FIG. 2 for details), that is, the first flow restriction member 4 and the second flow restriction member 5 are arranged in sequence in a water flow direction, and the flow rate of the first flow restriction member 4 is smaller than the flow rate of the second flow restriction member 5.

As shown in FIGS. 1, 2, 6 and 7, the second water inflow assembly 2 includes a second control valve 21 and a second water inflow pipeline 22. An inlet (not shown) of the second control valve 21 communicates with the centralized water supply port 71. The second control valve 21 includes two outlets, denoted as a first outlet 211 and a second outlet 212. The first outlet 211 communicates with the communication assembly 3 (see FIG. 6 for details), and the second outlet 212 communicates with the second water inflow pipeline 22 (see FIG. 7 for details). In a preferred situation, the number of the second control valve 21 and the number of the second water inflow pipeline 22 are both two, and the second control valves 21 correspond to the second water inflow pipelines 22 in a one-to-one correspondence. The second control valves 21 are also preferably solenoid valves, denoted as second solenoid valves 21, which can control on and off of the connection between the second water inflow pipelines 22 and the centralized water supply port 71, as well as the connection between the communication assembly 3 and the centralized water supply port 71.

As shown in FIGS. 1, 2, 6 and 7, the communication assembly 3 includes a communication pipeline 31 for communicating the first water inflow assembly 1 with the second water inflow assembly 2, and on-off control valves 32 for controlling on and off of the communication pipeline 31. A connection position between the first water inflow assembly 1 and the communication pipeline 31 is located between the first flow restriction member 4 and the second flow restriction member 5. One end of the communication pipeline 31 communicates with the water inlet 121 of the first water inflow pipeline 12 (the water inlet 121 is located between the first flow restriction member 4 and the second flow restriction member 5), and the other end of the communication pipeline 31 communicates with both the second outlets 212 of the two second control valves 21; the on-off control valves 32 are preferably one-way check valves 32, and the number of the one-way check valves 32 is also two. The one-way check valves 32 are respectively arranged inside the first outlets 211 of the two second solenoid valves 21 (see FIG. 6 for details) to prevent water from entering the second solenoid valves 21 from the first outlets 211; the number of the third flow restriction members 6 is also two, and they are respectively arranged inside the two second water inflow pipelines 22 (see FIG. 2 for details).

As shown in FIGS. 1, 2, 7 and 8, the communication pipeline 31 includes an annular plate 311 and a cover plate 312. A bottom of the annular plate 311 is sealedly connected with the body 7 of the water inflow device, and a top of the annular plate 311 is sealedly connected with the cover plate 312, so that a sealed communication pipeline 31 is formed. In a preferred situation, the annular plate 311 and the body 7 are integrally formed, and the annular plate 311 is fixedly connected with the cover plate 312 to facilitate inspection and replacement of the first flow restriction member 4 and the one-way check valves 32.

It should be noted that the specific structure of the communication pipeline 31 is not limited to the above specific structural form. For example, the communication pipeline 31 may be provided as a circular pipe; one end of the circular pipe is connected with the first water inflow pipeline 12, and a side wall of the circular pipe is provided with two ports, which communicate with the first outlets 211 of the two second solenoid valves 21 respectively, etc. Such adjustments and changes to the specific structural form of the communication pipeline 31 do not deviation from the principle and scope of the present disclosure, and should all be defined within the scope of protection of the present disclosure.

The working principle of the water inflow device of the present disclosure will be described below.

When the first solenoid valve 11 is turned on and the second solenoid valve 21 is turned off, water enters the first water inflow pipeline 12 through the first solenoid valve 11, and under the flow restriction action of the first flow restriction member 4, the flow rate of the water entering the first water inflow pipeline 12 is relatively small, so that the first water inflow pipeline 12 can supply water at a small flow rate. In addition, under the action of the one-way check valves 32, the water flow will not enter the second solenoid valves 21, nor will it enter the second water inflow pipelines 22, that is, in this case, only the first water inflow pipeline 12 supplies water at a small flow rate.

When the first solenoid valve 11 is turned off, one of the two second solenoid valves 21 is turned on and the other is turned off, the water is divided into two streams after entering the second solenoid valve 21 that is turned on; one of two streams of water flows through the first outlet 211 of this second solenoid valve 21 and enters the communication pipeline 31. Since the communication pipeline 31 is connected with the water inlet 121 of the first water inflow pipeline 12 (the water inlet 121 is located between the first flow restriction member 4 and the second flow restriction member 5), this stream of water will not pass through the first flow restriction member 4, but will directly enter the first water inflow pipeline 12 along the communication pipeline 31. Under the flow restriction action of the second flow restriction member 5, the second water inflow pipeline 22 can supply water at a large flow rate. The other stream of water flows into the second water inflow pipeline 22 through the second outlet 212 of this second solenoid valve 21. In addition, under the action of the one-way check valve 32, the water flow entering the communication pipeline 31 will not enter the second solenoid valve 21 in the turned-off state, nor will it enter the second water inflow pipeline 22 communicating with the second solenoid valve 21 in the turned-off state. That is, in this situation, the first water inflow pipeline 12 supplies water at a large flow rate, and one of the two second water inflow pipelines 22 supplies water. Moreover, the two second water inflow pipelines 22 of the second water inflow assembly 2 can supply water independently without being affected by each other.

When the first solenoid valve 11 is turned off and the two second solenoid valves 21 are both turned on, the water enters the two second solenoid valves 21 and then is each divided into two streams. Taking one of the paths (the second solenoid valve 21+the second water inflow pipeline 22) as an example, one of the two streams of water enters the communication pipeline 31 through the first outlet 211 of the second solenoid valve 21, and then enters the first water inflow pipeline 12 along the communication pipeline 31; under the flow restriction action of the second flow restriction member 5, the second water inflow pipeline 22 can supply water at a large flow rate; moreover, under the flow restriction action of the second flow restriction member 5, no matter whether one of the second solenoid valves 21 is turned on or both the second solenoid valves 21 are turned on, the water supply volume of the second water inflow pipeline 22 remains unchanged, so that a precise flow control is realized; the other stream of water enters the second water inflow pipeline 22 through the second outlet 212 of the second solenoid valve 21. Moreover, since the structures of the two paths (the second solenoid valve 21+the second water inflow pipeline 22) are completely identical, the flow rates of the two second water inflow pipelines 22 are the same at this time. That is, in this situation, the first water inflow pipeline 12 supplies water at a large flow rate, and the two second water inflow pipelines 22 supply water at the same time with the same water supply volume.

Through such an arrangement, the water inflow device of the present disclosure at least has the following advantages.

Figure 14:
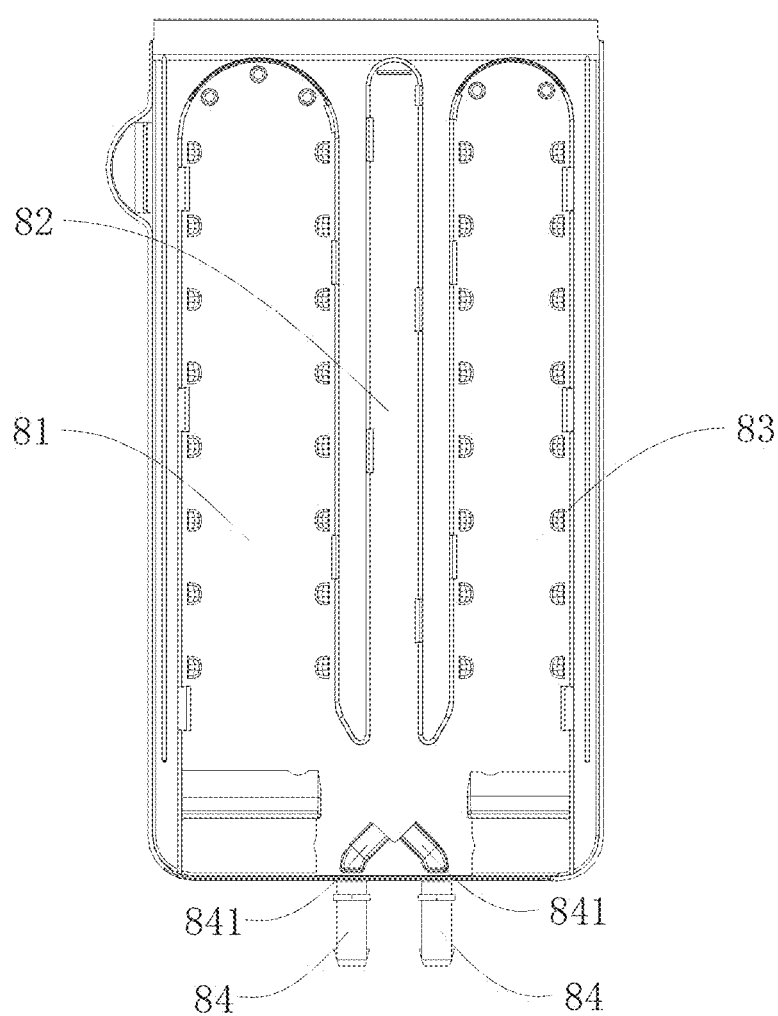
FIG. 14 is a schematic structural view of a detergent dispenser of the washing machine of the present disclosure.

First, the first water inflow pipeline 12 can realize water supply of two different flow rates, so that one solenoid valve (the price of which is relatively expensive) and one water inflow pipeline are cancelled, and further the volume and manufacture cost of the water inflow device can be reduced;

Second, by providing the flow restriction members (the first flow restriction member 4, the second flow restriction member 5 and the third flow restriction member 6), an accurate control of the flow rate can be achieved, and in practical applications, different models of flow restriction members can be substituted according to different functions, which is convenient and flexible, and has a wider application range;

Third, the two second water inflow pipelines 22 can not only supply water independently (complementary influence), but also can supply water at the same time with the same water supply volume. When the two second water inflow pipelines 22 supply water at the same time, opposed impact can be realized to change the flow direction of water, so that one solenoid valve and one water inflow pipeline can be further cancelled. Specifically, in a possible situation, as shown in FIG. 14, the detergent dispenser 8 includes a housing, and an interior of the housing is provided with three functional areas, namely, a first functional area 81, a second functional area 82 and a third functional area 83, which can be used to store different detergents; the detergent dispenser 8 further includes two water inflow pipes 84 communicating with the first functional area 81, the second functional area 82 and the third functional area 83; outlets of outlet sections 841 of the two water inflow pipes 84 are arranged opposite to each other and obliquely, and the two water inflow pipes 84 are connected with the two second water inflow pipelines 22 respectively. When water is supplied only from the water inflow pipe 84 on the left side, the water flows into the third functional area 83; when water is supplied only from the water inflow pipe 84 on the right side, the water flows into the first functional area 81; and when water is supplied from the two water inflow pipes 84 at the same time, the two streams of water impact each other opposedly, and the flow direction of water changes before flowing into the second functional area 82. That is, water supply to the three functional areas can be realized through the two second water inflow pipelines 22, thereby cancelling one solenoid valve and one water inflow pipeline, and further reducing the volume and manufacture cost of the water inflow device.

The structure of a kind of one-way check valve 32 will be described in detail below with reference to FIGS. 9 and 10.

Figure 9:
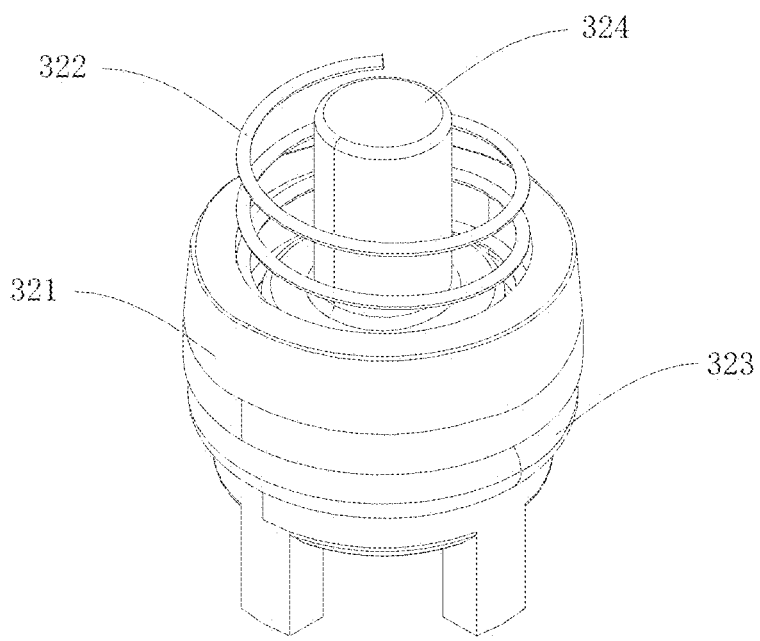
FIG. 9 is a first schematic structural view of a one-way check valve of the water inflow device of the present disclosure.
Figure 10:
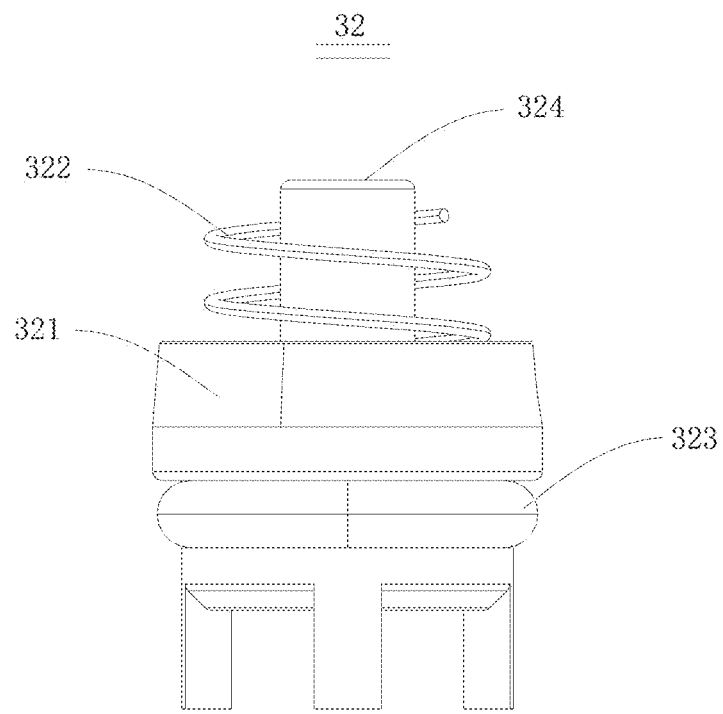
FIG. 10 is a second schematic structural view of the one-way check valve of the water inflow device of the present disclosure.

As shown in FIGS. 9 and 10, the one-way check valve 32 includes a valve seat 321, a return spring 322 and a sealing ring 323. The valve seat 321 is provided with a guide column 324, the return spring 322 is sleeved over the guide column 324, and the sealing ring 323 is sleeved over the valve seat 321.

Figure 3:
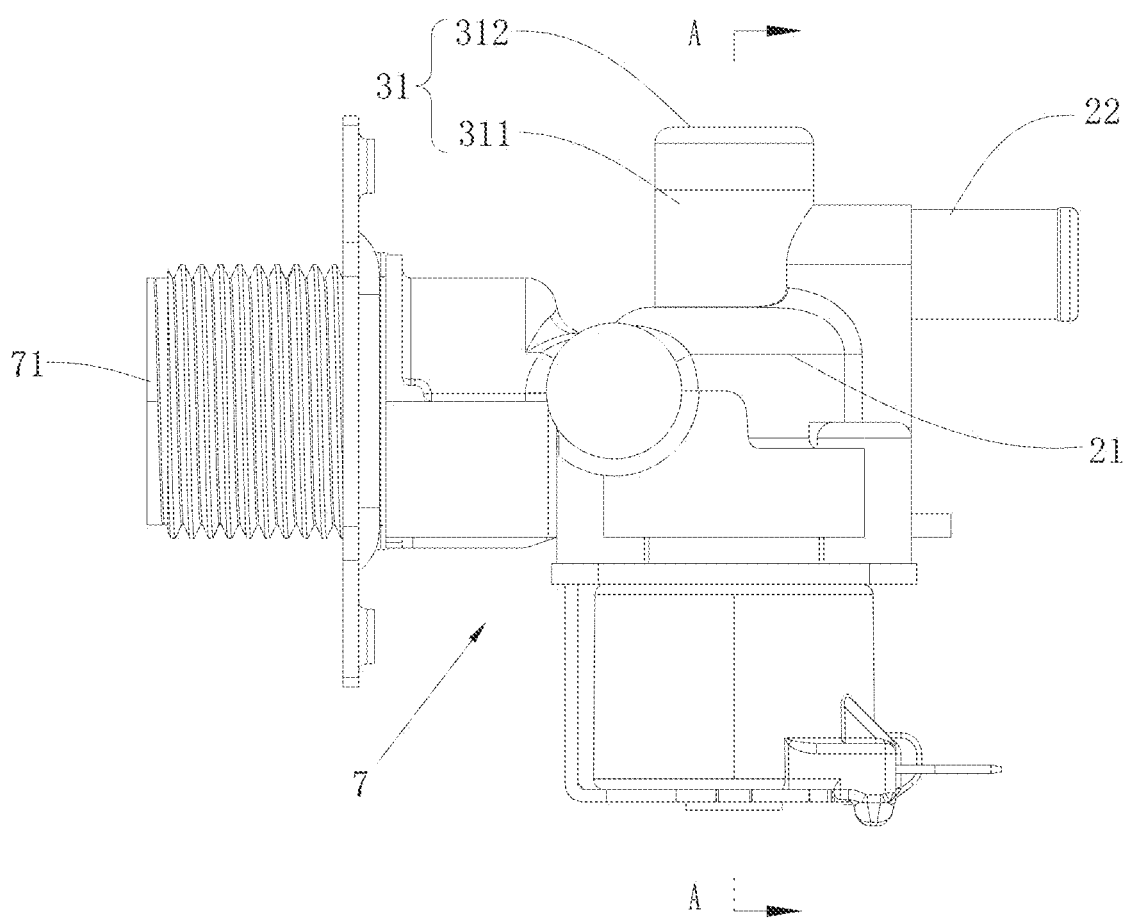
FIG. 3 is a third schematic structural view of the water inflow device of the present disclosure.
Figure 4:
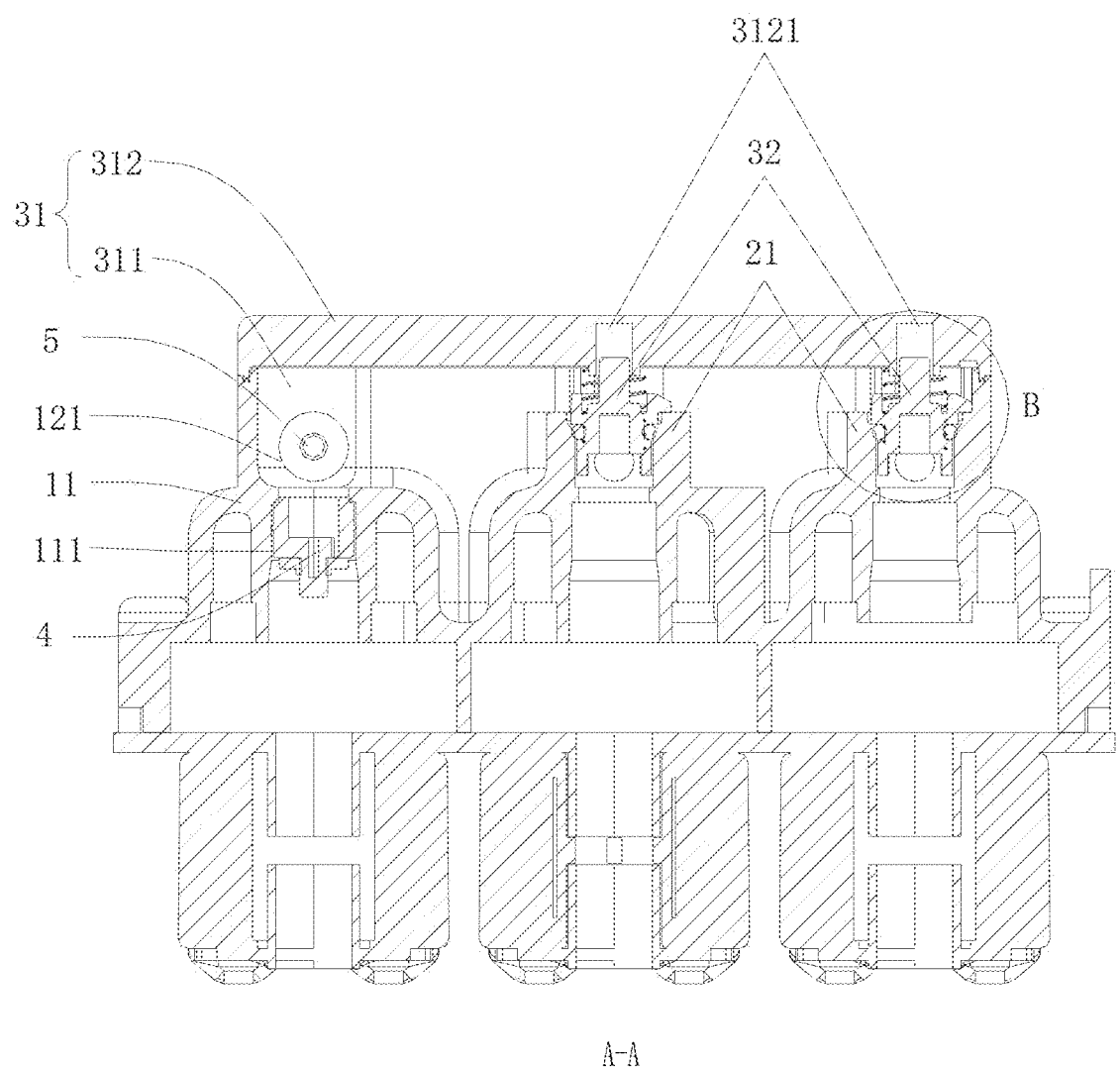
FIG. 4 is a cross sectional view of FIG. 3.
Figure 5:
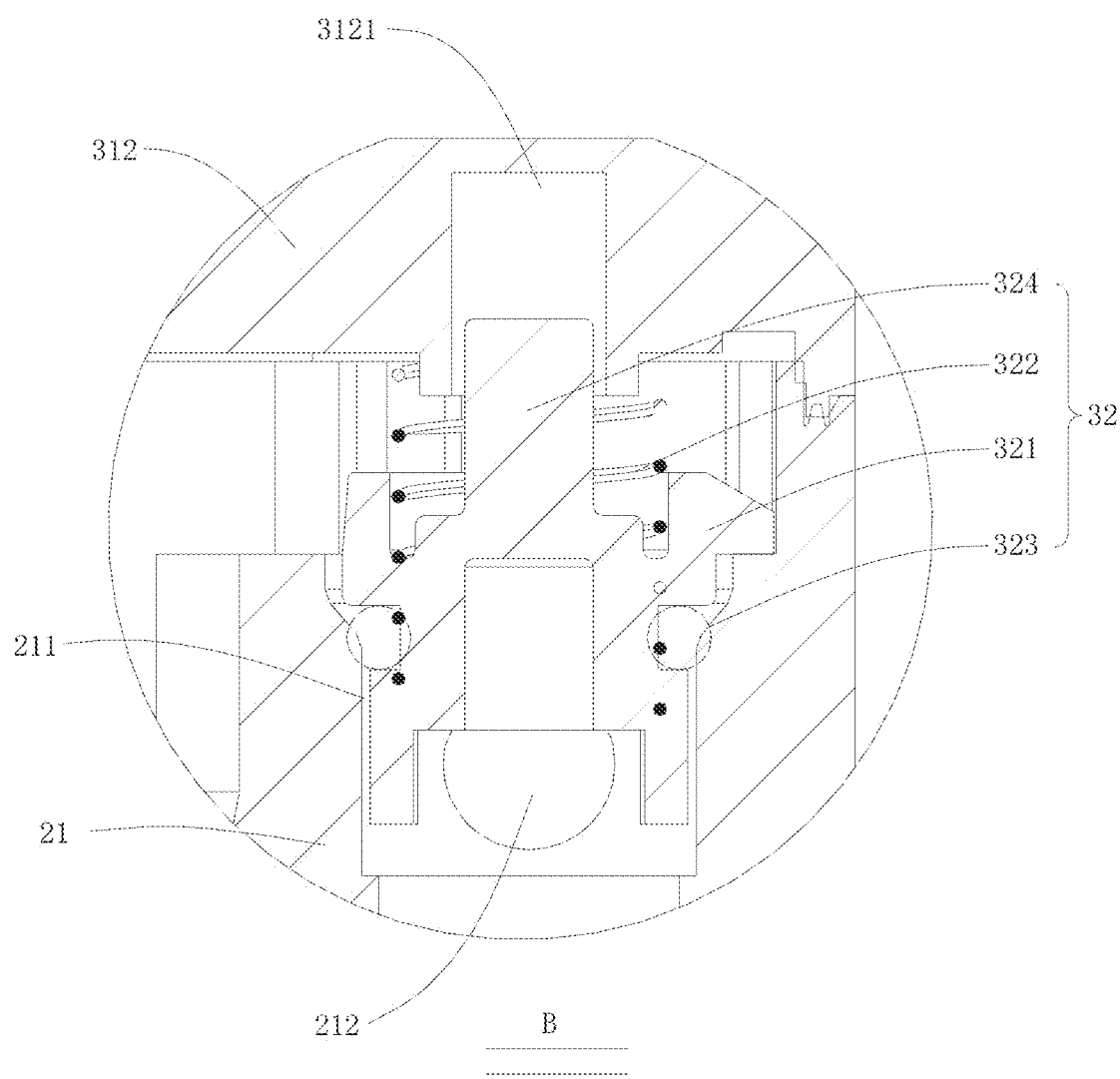
FIG. 5 is a partially enlarged view of FIG. 4.

In an installed state (the one-way check valve 32 is installed inside the first outlet 211 of the second solenoid valve 21), as shown in FIGS. 3, 4 and 5, a bottom end of the return spring 322 abuts against the valve seat 321, and a top end of the return spring 322 abuts against the cover plate 312 of the communication pipeline 31; a guide hole 3121 is arranged on the cover plate 312 (see FIG. 8 for details), and a top of the guide column 324 is inserted into the guide hole 3121. After the water enters the second solenoid valve 21, it moves upward whiling pushing the valve seat 321, so as to open the first outlet 211, and the water enters the communication pipeline 31 from the first outlet 211. After water inflow is completed, the valve seat 321 moves downward under the action of the return spring 322 to seal the first outlet 211 again. In the sealed state, the sealing ring 323 is located between an inner wall of the first outlet 211 and the valve seat 321.

It should be noted that the structure of the above one-way check valve 32 does not limit the present disclosure, and one-way check valves 32 using other structures are also within the scope of protection of the present disclosure.

Figure 11:
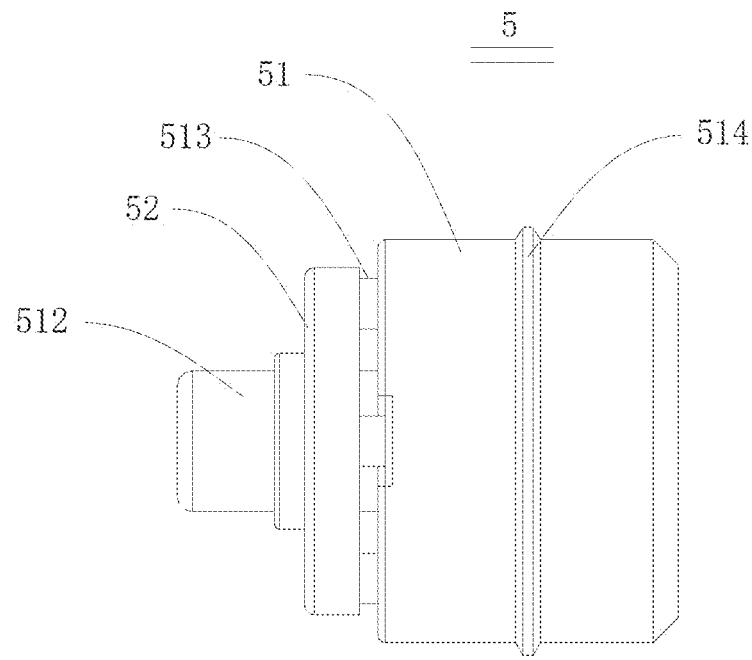
FIG. 11 is a first schematic structural view of a flow restriction member of the water inflow device of the present disclosure.
Figure 12:
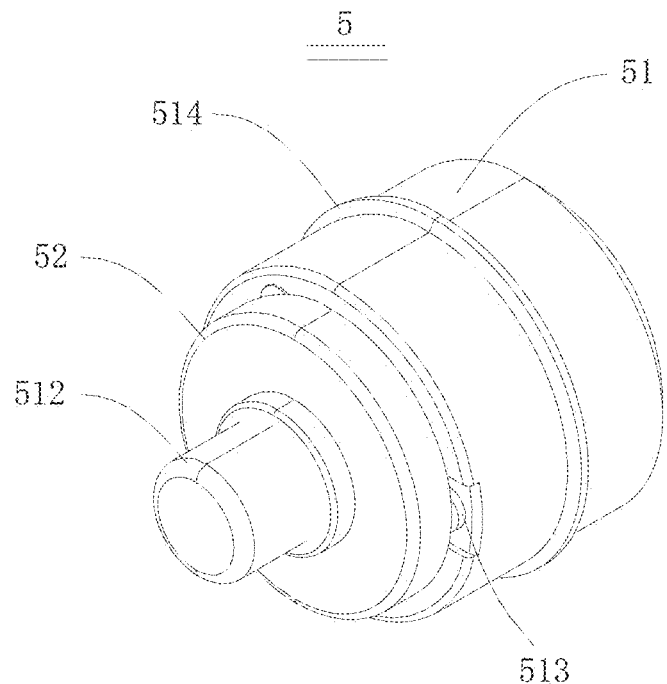
FIG. 12 is a second schematic structural view of the flow restriction member of the water inflow device of the present disclosure.
Figure 13:
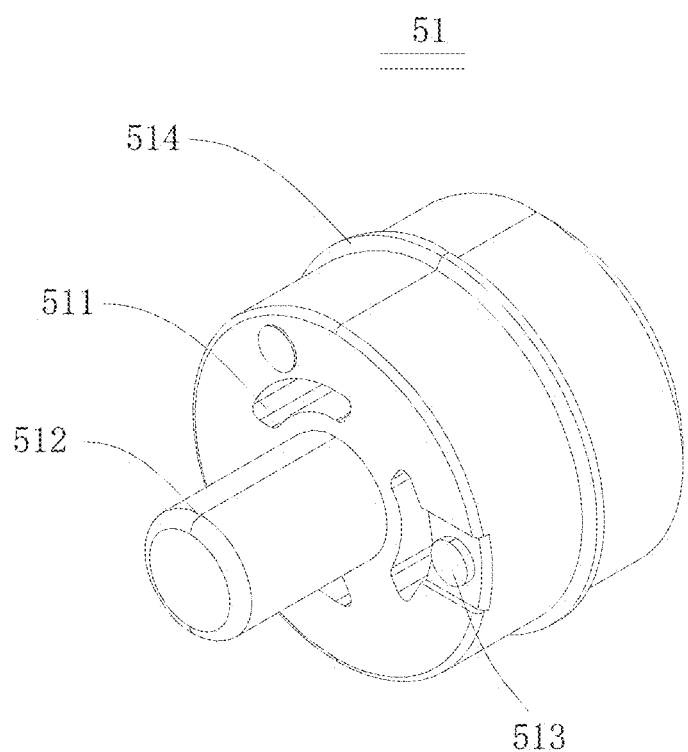
FIG. 13 is a schematic structural view of a flow restriction seat of the flow restriction member of the present disclosure.

The structure of a kind of flow restriction member will be described in detail below with reference to FIGS. 11 to 13.

First, it should be noted that in this embodiment, flow restriction members of the same type are used for the first flow restriction member 4, the second flow restriction member 5 and the third flow restriction member 6. Taking the second flow restriction member 5 as an example, as shown in FIGS. 11 to 13, it includes a flow restriction seat 51 and a flow restriction plate 52. The flow restriction seat 51 is provided with flow restriction holes 511, a connection shaft 512, protrusions 513 and a sealing ring 514. The flow restriction plate 52 is sleeved over the connection shaft 512, and a right side of the flow restriction plate 52 abuts against the protrusions 513 so that there is a gap between the flow restriction plate 52 and the flow restriction seat 51. The gap serves to restrict the flow, and a size of the gap determines the magnitude of the flow rate. The gap is in communication with the flow restriction holes 511, and water flows out from the flow restriction holes 511. In an installed state, the sealing ring 514 abuts against an inner wall of the first water inflow pipeline 12.

It should be noted that the above type of flow restriction members can be used for each of the first flow restriction member 4, the second flow restriction member 5 and the third flow restriction member 6, or other different types of flow restriction members can also be used for them respectively. Such flexible adjustments and changes do not deviate from the principle and scope of the present disclosure, and should all be defined within the scope of protection of the present disclosure.

In addition, it should also be noted that although the present disclosure only provides an embodiment for the flow restriction members, it should be understood by those skilled in the art that the contribution of the present disclosure to the prior art is mainly reflected in that the first flow restriction member 4 (small flow rate) and the second flow restriction member 5 (large flow rate) are arranged in sequence on the first water inflow assembly 1 in the water flow direction, and the connection position between the first water inflow assembly 1 and the communication assembly 3 is located between the first flow restriction member 4 and the second flow restriction member 5, so that the first water inflow assembly 1 can achieve water supply of two flow rates, and can achieve a more accurate flow control. Therefore, the use of other structures of flow restriction members is also within the scope of protection of the present disclosure.

Second Embodiment

On the basis of not changing other arrangement conditions of the first embodiment, the third flow restriction member 6 is cancelled. When the function corresponding to the second water inflow assembly 2 does not have a high requirement on the flow rate of water inflow, the third flow restriction member 6 can be cancelled.

Third Embodiment

On the basis of not changing other arrangement conditions of the first embodiment, one of the second solenoid valves 21, one of the one-way check valves 32, one of the second water inflow pipelines 22 and one of the third flow restriction members 6 are cancelled. That is, the second water inflow assembly 2 includes only one second solenoid valve 21 and only one second water inflow pipeline 22, and the number of the one-way check valve 32 and the number of the third flow restriction member 6 are both one. The one-way check valve 32 is arranged inside the first outlet 211 of the second solenoid valve 21, and the third flow restriction member 6 is arranged inside the second water inflow pipeline 22.

Hitherto, the technical solutions of the present disclosure have been described in connection with the preferred embodiments shown in the accompanying drawings, but it is easily understood by those skilled in the art that the scope of protection of the present disclosure is obviously not limited to these specific embodiments. Without departing from the principles of the present disclosure, those skilled in the art can make equivalent changes or replacements to relevant technical features. All these technical solutions after such changes or replacements will fall within the scope of protection of the present disclosure.

What is claimed is:

1. A water inflow device for a washing apparatus, the water inflow device comprising: a body, a first water inflow assembly, a second water inflow assembly, a communication assembly, a first flow restriction member and a second flow restriction member that are arranged on the body; the first flow restriction member and the second flow restriction member are arranged in sequence on the first water inflow assembly in a water flow direction, and a flow rate of the first flow restriction member is smaller than a flow rate of the second flow restriction member; the communication assembly comprises a communication pipeline for communicating the first water inflow assembly with the second water inflow assembly, and an on-off control valve for controlling on and off of the communication pipeline; and a connection position between the first water inflow assembly and the communication pipeline is located between the first flow restriction member and the second flow restriction member.

2. The water inflow device according to claim 1, wherein the first water inflow assembly comprises a first control valve and a first water inflow pipeline that are connected, the first flow restriction member is arranged inside an outlet of the first control valve, and the second flow restriction member is arranged inside the first water inflow pipeline.

3. The water inflow device according to claim 1, wherein the second water inflow assembly comprises a second control valve and a second water inflow pipeline, and the second control valve comprises a first outlet and a second outlet, wherein the first outlet communicates with the communication pipeline, and the second outlet communicates with the second water inflow pipeline.

4. The water inflow device according to claim 3, wherein a number of the second control valve and the second water inflow pipeline are both two, and the second control valves and the second water inflow pipelines correspond to each other in a one-to-one correspondence.

5. The water inflow device according to claim 4, wherein the on-off control valve is a one-way check valve, and a number of the one-way check valve is two; the one-way check valves are respectively arranged inside the first outlets of the two second control valves to prevent water from entering the second control valves from the first outlets.

6. The water inflow device according to claim 4, further comprising third flow restriction members, a number of which is two, and the third flow restriction members are respectively arranged inside the two second water inflow pipelines.

7. The water inflow device according to claim 2, wherein the first control valve is a solenoid valve.

8. The water inflow device according to claim 3, wherein the second control valve is a solenoid valve.

9. A washing apparatus, comprising the water inflow device according to claim 1.

10. The washing apparatus according to claim 9, wherein the washing apparatus is a washing machine which comprises a condenser and a detergent dispenser, the first water inflow assembly communicates with the condenser, and the second water inflow assembly communicates with the detergent dispenser.

* * * * *